United States Patent [19]

Bryan et al.

[11] 4,280,383
[45] Jul. 28, 1981

[54] TEXTILE COT REMOVER

[75] Inventors: James S. Bryan, Clyde; Mayo B. Tell, Asheville; Alvin R. Brooks, Jr., Waynesville; Ivan Gaster, Hazelwood, all of N.C.

[73] Assignee: Dayco Corporation, Dayton, Ohio

[21] Appl. No.: 124,509

[22] Filed: Feb. 25, 1980

[51] Int. Cl.³ .............................................. B26D 3/00
[52] U.S. Cl. ..................................... 83/140; 29/426.4; 83/620; 83/697; 83/924
[58] Field of Search ..................... 83/13, 23, 54, 140, 83/620, 697, 924; 29/426.4, 564.3, 565; 30/272

[56] References Cited

U.S. PATENT DOCUMENTS

| | | | |
|---|---|---|---|
| 3,000,097 | 9/1961 | Hartz | 29/426.4 X |
| 3,231,972 | 2/1966 | Annese | 29/426.4 X |

*Primary Examiner*—J. M. Meister
*Attorney, Agent, or Firm*—Charles E. Bricker

[57] ABSTRACT

A tool for cutting a textile cot from an associated mandrel is provided wherein such tool is particularly adapted to be attached to one of a cooperating pair of machine components which are relatively movable toward and away from each other and a mandrel with a cot to be cut supported on the other component whereupon the cot is cut axially along its length upon relatively moving the components toward each other.

11 Claims, 7 Drawing Figures

TEXTILE COT REMOVER

BACKGROUND OF THE INVENTION

1. Field of the Invention

This invention relates to a tool for the removal of textile cots from associated mandrels and to a method of making such a tool.

2. Prior Art Statement

Textile cots are widely used in the textile industry for drafting or drawing textile fibers to produce yarn, sliver, roving, and the like; and, in the course of using these cots they become worn and must be replaced periodically. Particularly in the case of so-called hard base cots, i.e. cots which employ a tubular core or base member made of a material which is comparatively harder than the outer sleevelike working member of the cot it is generally very difficult to remove such cots from their associated mandrels utilizing ordinary hand tools. In addition, cot removal using ordinary hand tools often requires expenditure of substantial time and the associated supporting mandrel of a cot being thus removed is often damaged in the process.

Accordingly, the need exists for a tool of simple and economical construction which may be utilized with a simple machine such as a hand press, or the like, commonly available at a textile fiber processing facility for the purpose of removing a cot from its associated cot supporting mandrel in a minimum of time without damage to such mandrel.

SUMMARY

It is a feature of this invention to provide a simple and economical tool which may be used with a simple machine, such as a hand press, for example, for removing textile cots from associated mandrels.

Another feature of this invention is to provide a tool of the character mentioned which has means for readily attaching same on such simple machine.

Another feature of this invention is to provide a tool of the character mentioned particularly adapted to remove cots having a hard core or base.

Another feature of this invention is to provide a tool of the character mentioned comprising, a housing having an axial passage therethrough including an enlargement defining one end thereof, a mandrel-engaging assembly supported for reciprocating axial movements within the passage through a distance at least equal to the axial length of a cot to be cut by the tool with the assembly having a mandrel-engaging outer surface, means fastening a cutting blade to the housing with the cutting blade having cutting edge means disposed within the enlargement, urging means yieldingly urging the assembly at least the said distance along the passage into the enlargement, stop means limiting the extent of movement of the assembly as induced by the urging means, and means for attaching the housing on one of a cooperating pair of machine components which are relatively movable toward and away from each other. The tool is adapted to be attached on the one component employing its attaching means and a mandrel with a cot to be cut supported on the other component with the cot aligned to be received within the enlargement. The components are adapted to be relatively moved toward each other causing the outer surface of the assembly to engage and frictionally hold the mandrel and causing the housing to override the urging means and telescope around the assembly enabling the cutting edge means to be moved axially along the cot thereby cutting same with the urging means serving to eject the cot and mandrel assembly from within the enlargement once the components are relatively moved away from each other.

Another feature of this invention is to provide an improved method of making a tool of the character mentioned.

Accordingly, it is an object of this invention to provide an improved tool and method of making same having one or more of the novel features set forth above or hereinafter shown or described.

Other objects, features, details, uses, and advantages of this invention will be readily apparent from the embodiments thereof presented in the following specification, claims and drawings.

BRIEF DESCRIPTION OF THE DRAWINGS

The accompanying drawings show a present preferred embodiment of this invention, in which.

DETAILED DESCRIPTION

Figure 1:
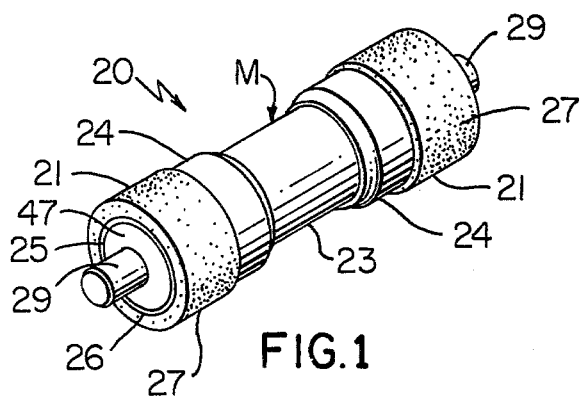
FIG. 1 is a perspective view illustrating a cot assembly which has a pair of cots disposed on opposite end portions thereof and which are particularly adapted to be cut employing the tool of this invention.
Figure 2:
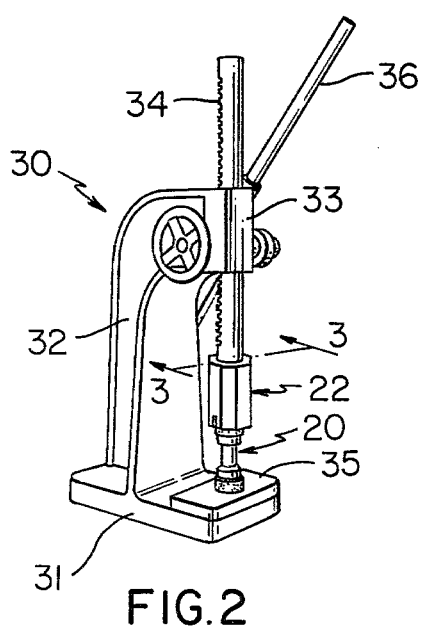
FIG. 2 is a perspective view illustrating one exemplary embodiment of the tool of this invention used on a simple machine in the form of a typical hand press commonly available at a manufacturing facility.

Reference is now made to FIG. 1 of the drawings which illustrates an exemplary cot assembly 20 which has a pair of cots each designated by the same reference numeral 21 suitably mounted on opposite end portions thereof and each of the cots may be readily cut for removal from the assembly utilizing the cutting tool of this invention which is designated generally by the reference numeral 22 and as illustrated in FIG. 2, for example. The cot assembly 20 comprises a mandrel M having a central portion 23 provided with enlarged diameter outer portions 24 each having a necked or reduced diameter right circular cylindrical end portion 25 (FIG. 3) against which an associated cot 21 is supported as is known in the art. The cot assembly 20 also has a pair of support shafts 29 extending from its opposite ends and in particular from the opposite ends of the central portion 23 of mandrel M. The support shafts 29 are particularly adapted to be rotatably supported on associated textile machinery.

Each of the cots 21 comprising the cot assembly 20 may be of any suitable known type and is mounted on its associated right circular cylindrical outer end portion 25 employing a friction fit, adhesive means, or the like therebetween. Each cot 21 may be a regular base cot or a so-called hard base cot and the tool 22 is particularly adapted to cut same along its axial length as will be described subsequently. In this example each cot 21 has a hard core or base 26 and a comparatively resilient or yieldable outer portion 27. The core or base 26 may be made of any suitable material and thus is indicated by a general cross-hatching symbol in the drawing; however, such core is preferably made of a hard rubber.

The tool 22 is particularly adapted to be attached to and used on a simple machine tool, shown as a manually operated press in this example, which is designated generally by the reference numeral 30 in FIG. 2. The press 30 has the usual base 31, an upstanding supporting column 32, and a head assembly 33 which curves over the base in vertical alignment thereabove and the assembly 33 supports a rack 34 as is known in the art. The rack 34 may be moved toward and away from a stationary platen 35 supported on the base 31 by suitable operation of a hand lever 36. The press also has the usual hand crank which may be used to operate the rack 34 as is known in the art.

The components 34 and 35 are the relatively movable components of the machine or press 30; and, in this example the platen 35 is stationary with the rack 34 being movable toward and away from such platen 35. It will also be seen that the platen has an opening 38 disposed in vertical alignment with a central longitudinal axis through the tool 22.

The tool 22 comprises a housing 40 (FIG. 3) having an axial passage 41 therethrough including an enlargement 42 defining one end of the axial passage 41. The tool 22 has a mandrel-engaging assembly 43 supported for reciprocating axial movement within the passage 41 through a distance 44 which is at least equal to the axial length 45 of a cot 21 to be cut by the tool 22 and preferably the axial length 44 is greater than the axial length 45 of the cot to be cut for reasons which will be apparent from the following description. The assembly 43 has an annular mandrel-engaging outer surface 46 which is particularly adapted to engage an annular outer surface 47 of the mandrel 23 disposed concentrically around an associated support shaft 29.

The tool 22 has at least one cot cutting blade 50 attached or fastened to the housing 40 in a manner to be subsequently described and in this example of the invention a pair of blades 50 are fastened to the housing 40 at diametrically opposed positions on the housing 40 and each blade 50 has a cutting edge 51 disposed within the enlargement 42.

The tool 22 has urging means 54 for yieldingly urging the mandrel-engaging assembly 43 outwardly from the housing 40 by a distance at least equal to the distance 45. In this example the urging means is a mechanical compression spring 54 which urges the assembly 43 by the greater distance 44 along the axial passage 41 and toward and within the enlargement 42.

The tool 22 also has a stop means designated generally by the reference numeral 55 and such stop means will be described in more detail subsequently. The stop means 55 serves to limit the extent of movement of the assembly 43 as induced by the spring 54.

The tool 22 has means for attaching the housing 40 on one of the cooperating pair of machine components and in this example of the invention it will be seen that the housing 40 has female threads 56 provided in the end portion thereof opposite from the enlargement 42. The female threads 56 are particularly adapted to be threadedly fastened to a threaded rod extension 57 extending from rack or rack member 34 of the hand press 30 to thereby detachably fasten the tool 22 on the movable rack 34.

Once the tool 22 is attached to the rack 34 employing threaded extension 57 and female threads 56, the mandrel M of the cot assembly 20 is supported on the platen 35 with a lower support shaft extending through opening 38. The members 34 and 35 are then relatively moved toward each other to provide a cot cutting action; and, in this example the member 34 with the tool securely threadedly fastened thereto is moved toward the cot assembly 20 causing the mandrel engaging outer surface 46 of the assembly 43 to engage the mandrel M by engaging surface 47 thereof and causing the housing 40 to override the compression spring 54 and telescope around the assembly 43. This action enables the cutting edges 51 to be moved axially along the cot 21 thereby cutting same. The cutting edges 51 cut completely through the resilient outer portion 27 of the cot and through practically the entire radial thickness of the hard core 26. The tool 22 is moved so that its cutting edges 51 traverse the full axial length of the cot 21 and this cutting movement is controlled manually and by visual observation. In addition, the axial cutting movement is also stopped once the lower edges of the blades engage the outer edge of an associated mandrel enlargement 24.

Once the cutting action is complete the member 34 is lifted by lifting the handle 36 thereby moving the tool 22 upwardly whereupon the compression spring 54 serves to eject the cot 21 and assembly 20 from within the enlargement 42. The cot assembly 20 may then be inverted and the cot 21 at its opposite end cut in a similar manner as described above.

The assembly 43 is comprised of a plurality of portions including a central portion 60 provided with an enlarged diameter annular projection 61. The previously described urging means or compression spring 54 acts between the projection 61 and an annular surface 62 in the housing 40 which comprises a stepped surface of the axial passage 41.

The assembly 43 has an outer portion 63 (FIGS. 3 and 4) which is adapted to move into and out of the enlargement 42. The outer portion 63 is basically a tubular portion which has an outer bore 65 in its outer end portion and has an inner end provided with female threads 66 which are in threaded engagement with male threads 67 provided on the central part 60 of the assembly 43 adjoining the annular projection 61. The outer portion 63 also has a counterbore 70 which adjoins the bore 65 and defines a stop shoulder 71 between the bore 65 and counterbore 70.

The tool 22 has a plunger 72 supported for axial movement within the outer portion 63 and toward and away from the annular outer surface 46. The plunger 72 has a large diameter portion 73 supported within counterbore 70 and an adjoining integral smaller diameter portion 74 supported within the bore 65. A second compression spring shown as a comparatively small spring 76 is provided and acts between the plunger 72 and the central part 60 of the assembly 43 and serves to yieldingly urge the plunger 72 toward the mandrel-engaging outer surface 46. The bore 65 is particularly adapted to receive a support shaft similar to the shaft 29 of the assembly 20, although larger in diameter, thereby overriding the compression spring 76 of the plunger 72 and thereby enabling the mandrel-engaging surface 46 to engage a mandrel M concentrically outwardly of an associated larger diameter shaft 29. A modified assembly 20 having a larger diameter support shaft 29 is not shown in this disclosure; however, the above description clearly presents the manner in which the tool 22 may be used in cutting a cot 21 provided on such a modified assembly inasmuch as all dimensions thereof would be identical to the assembly 20, except for the larger diameter support shaft 29.

Figure 3:
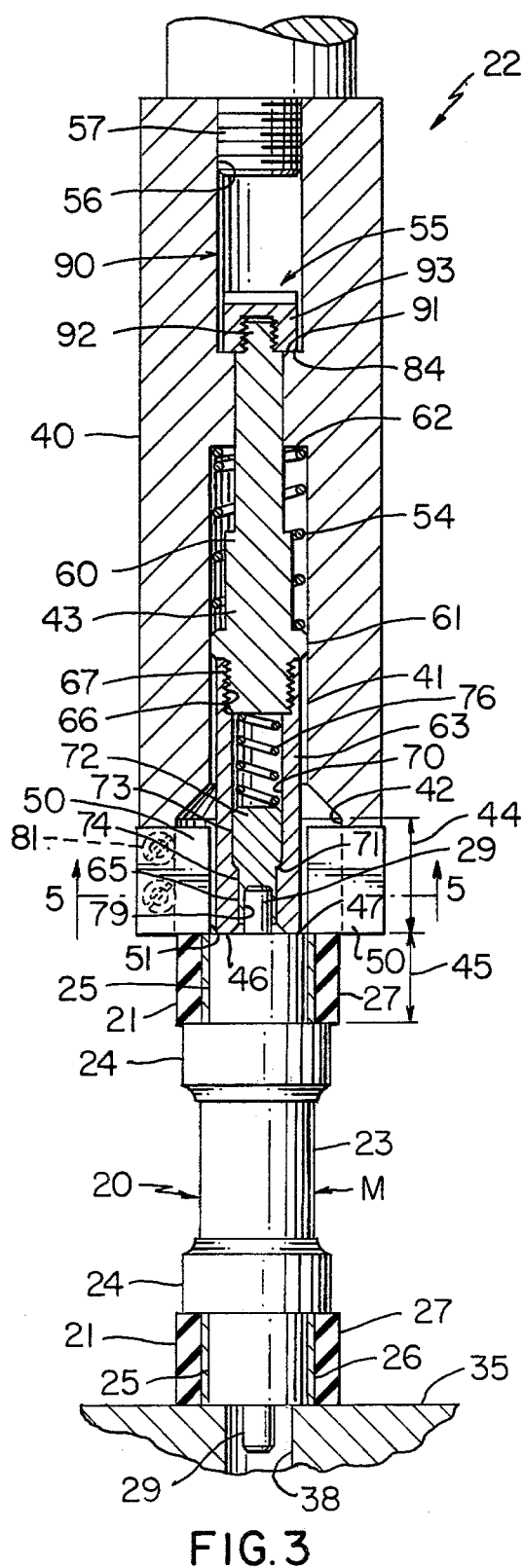
FIG. 3 is an enlarged view with parts in cross section, parts in elevation, and parts broken away taken essentially on a line 3—3 of FIG. 2 and showing the position of the tool prior to commencing the cutting action.
Figure 4:
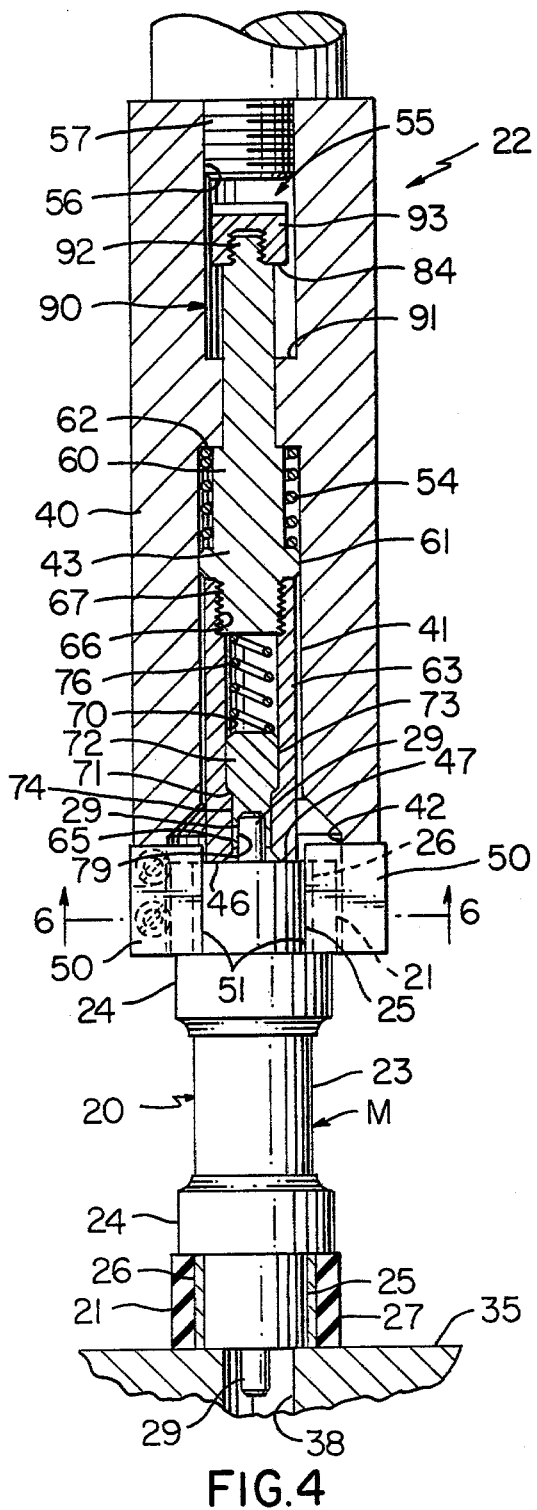
FIG. 4 is a view similar to FIG. 3 showing the position of the tool at the completion of the cutting action.

The cot assembly 20 of this example has a smaller diameter support shaft 29. The support shaft 29 of the illustrated assembly 20 is particularly adapted to be received in a right circular cylindrical opening 79 in the small diameter portion 74 of said plunger 72. The sizes of the shaft 29 and opening 79 are such that upon using the tool 22 to cut a cot 21 the shaft 29 is received completely within the opening 79 allowing surface 46 to engage surface 47 of the mandrel 23 concentrically outwardly of said smaller diameter support shaft in an unobstructed manner while allowing the compression spring 76 to remain in the extended condition as shown in FIGS. 3 and 4.

Figure 5:
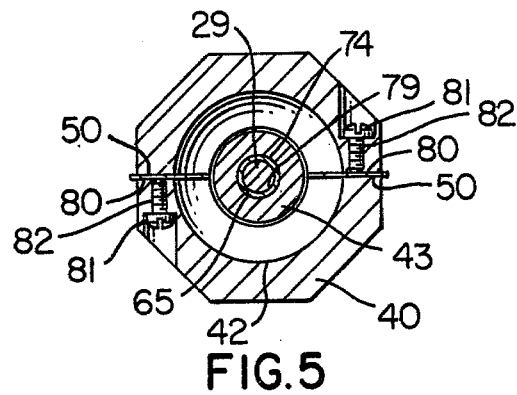
FIG. 5 is a view taken essentially on the line 5—5 of FIG. 3.
Figure 6:
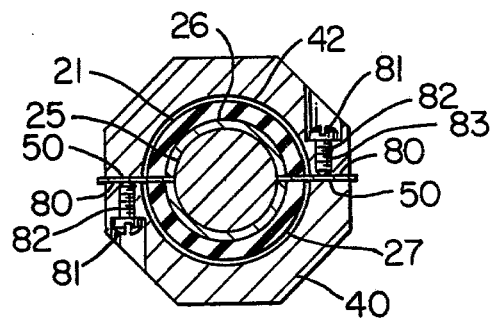
FIG. 6 is a view taken essentially on the line 6—6 of FIG. 4.

As will be readily apparent from FIGS. 5 and 6, the housing 40 has a pair of diametrically opposed axial and radial slots each designated by the same reference numeral 80; and, each slot is disposed in the housing along the enlargement 42 and communicates with such enlargement whereby each slot 80 communicates with the enlargement 42 substantially along its entire axial length. Each of the slots 80 has an associated cutting blade 50 disposed therewithin and it will be seen that each cutting blade 50 is detachably fastened in its associated slot 80 by detachable fasteners shown as a pair of threaded screws for each blade 50 with each screw being designated by the same reference numeral 81.

Each blade 50 is held in position with its cutting edge 51 within the enlargement 42 by the terminal outer portions 82 of the threaded screws 81. Each of the screws 81 is received through an associated threaded opening 83 provided in the housing 40, as indicated in FIG. 6.

The blades 50 and in particular the cutting edges 51 thereof are disposed in the enlargement 42 at precise positions so that upon using the tool 22 to cut a cot 21 of a cot assembly 20 each blade severs completely through the outer portion 27 of each cot 21 and substantially completely through the radial thickness of the hard base or core 26 as previously mentioned. The precise positioning of the cutting edges 51 is achieved by inserting a setting tool (not shown) concentrically within the enlargement 42 after loosening the threaded screws 81. With the setting tool in position the cutting edges 51 are moved snugly against a right circular cylindrical outside surface of the tool whereupon the threaded screws 81 are then tightened thereby establishing the precise position of the cutting edges 51. The setting tool is then axially withdrawn and the tool 22 is ready for use in cutting cots of a particular size.

It will be appreciated that each cot which is cut with the tool 22 has a core 26 of standard thickness and a standard thickness for the resilient outer portion 27. Accordingly, once the cutting blades 50 are set on the tool 22 such tool may be used to cut standard size cots 21 until the cutting blades 50 require replacement either due to damage thereto or for sharpening purposes.

As previously indicated the tool 22 has stop means 55 provided therein and preferably defined as an integral part thereof. The stop means 55 comprises a second enlargement 90 defining the opposite end portion of the axial passage 41 and defining an annular stop ledge 91. The stop means 55 also comprises a male threaded portion 92 at the rear portion of the central portion 60 of the assembly 43 and a cooperating threaded nut-like member 93 threadedly engaged with the male threaded portion 92 and disposed within the second enlargement 80. The nut-like member 93 has a peripheral shoulder 84 which engages the annular stop ledge 91 upon urging of the assembly 43 by the urging means or compression spring 54.

Figure 7:
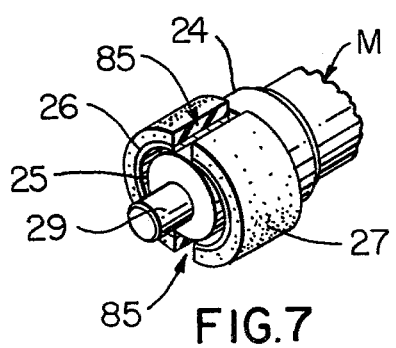
FIG. 7 is a fragmentary perspective view illustrating an end of the cot-supporting mandrel assembly of FIG. 1 and an associated cot at the completion of the cot cutting action as achieved in FIG. 4 and showing the cot halves in radially spaced relation from the mandrel.

The tool 22 is particularly adapted to be used in cutting cots 21 from an associated cot assembly 20 once such cots are to be replaced and in this example of the invention a pair of diametrically opposed cutting blades 50 having cutting edges 51 are provided and provide diametrically opposed cuts in the cot 21 as shown at a pair of locations 85 in FIG. 7. The cots 21 provided on the assembly 20 are hard base cots, as mentioned earlier, which in this example are pressed on their cylindrical portions and held in position by friction. The cutting edges 51 of the blades are set such that roughly one-thousandth of an inch of the inner portion of the core or base remains uncut; however, the physical properties of such a hard base cot are such that upon leaving roughly one-thousandth of an inch of core material at diametrically opposed positions on the cot, once the cutting edges 51 travel the axial length of the cot it still severs completely through the uncut portion and semicylindrical cot portions either spring apart, essentially as shown in FIG. 7, or may be easily pried away from the mandrel as shown.

In those instances where each cot 21 is adhesively fastened in position a prying action is employed to break the adhesive bond between it and its supporting right circular cylindrical portion 25. Further, in those instances where a cot 21 is adhesively bonded to its mandrel portion 25 the cot assembly 20 may be rotated on the platen 35 through an angular increment such as 90° for example, and the cutting repeated to provide another pair of diametrically opposed axial cuts along the cot. In this latter instance the cot would be cut essentially into four portions and may be more easily pried away with a screwdriver, or like instrument. Any desired number of axial cuts may be similarly provided to facilite removal of an adhesively fastened cot.

Once the cutting action is completed it will be appreciated that the lever 36 of the hand press 30 may be raised allowing the compression spring 54 to eject the mandrel or cot assembly 20 and the axially cut cot from within the enlargement 42.

In this disclosure of the invention a particular type of mandrel M has been shown as part of the cot assembly 20 and has an annular outer surface 47 which is engaged by surface 46 of the tool 22. The mandrel M is shown as having a standard support shaft 29 of comparatively small size which is received within the opening 79 of the plunger 72. Typically, such a comparatively small diameter support shaft 29 has a 5/16th inch outside diameter. The tool 22 may also be used to cut cots 21 from a cot assembly wherein the support shaft 29 of its mandrel M has a larger standard outside diameter of ⅜ of an inch. In this latter instance the plunger 72 would be urged inwardly compressing the spring 76 and still allowing the mandrel engaging surface 46 to engage the annular outer surface 47 of the cot assembly 20. A similar construction technique may be employed to accomodate support shafts of any suitable size.

In this disclosure of the invention the tool 22 utilizes a pair of diametrically opposed cutting blades 50; however, it is to be understood that a single cutting blade may be utilized, if desired, or any desired number (greater than two) of cutting blades may be utilized.

It will also be appreciated with the technique of installing cutting blades 50 utilizing threaded screws 81, as described, it is a simple matter to set the blades to any desired position to provide the desired cutting action as well as to replace blades once they become damaged or require sharpening.

In this disclosure of the invention the description has been directed to the provision of apparatus for cutting of a hard base cot; however, it is to be understood that the apparatus of this invention may be used to cut any type of cot.

While present exemplary embodiments of this invention, and methods of practicing the same, have been illustrated and described, it will be recognized that this invention may be otherwise variously embodied and practiced within the scope of the following claims.

What is claimed is:

1. In a tool for cutting a textile cot from an associated mandrel, said tool having a cot cutting blade, the improvement comprising, a housing having an axial passage therethrough including an enlargement defining one end thereof, a mandrel-engaging assembly supported for reciprocating axial movements within said passage through a distance at least equal to the axial length of a cot to be cut by said tool, said assembly having a mandrel-engaging outer surface, means fastening said cutting blade to said housing, said cutting blade having cutting edge means disposed within said enlargement, urging means yieldingly urging said assembly at least said distance along said passage into said enlargement, stop means limiting the extent of movement of said assembly as induced by said urging means, and means for attaching said housing on one of a cooperating pair of machine components which are relatively movable toward and away from each other, said tool being adapted to be attached on said one component with said attaching means and a mandrel with a cot to be cut supported on said other component with said cot aligned to be received within said enlargement, said components being adapted to be relatively moved toward each other causing said outer surface of said assembly to engage said mandrel and causing said housing to override said urging means and telescope around said assembly enabling said cutting edge means to be moved axially along said cot thereby cutting same, said urging means serving to eject said cot and mandrel from within said enlargement once said components are relatively moved away from each other.

2. A tool as set forth in claim 1 in which said assembly has an outer portion which is adapted to move into and out of said enlargement, said outer portion having said outer surface defining its terminal outer end.

3. A tool as set forth in claim 2 in which said outer portion has an outer bore therein adjoined by a counterbore defining an annular surface therebetween and said tool further comprises, a plunger supported for axial movements within said outer portion toward and away from said outer surface, said plunger having a large diameter portion supported within said counterbore, said plunger having a small diameter portion adjoining said large diameter portion and defining a stop shoulder therebetween, said small diameter portion being supported within said bore, a compression spring yieldingly urging said plunger toward said outer surface and with said stop shoulder against said annular surface, said bore being adapted to receive a support shaft of said mandrel therein with said support shaft overriding said compression spring of said plunger and thereby enabling said outer surface to engage said mandrel concentrically outwardly of said support shaft.

4. A tool as set forth in claim 3 in which said small diameter portion of said plunger has a cylindrical opening therein which is adapted to receive a support shaft of said mandrel having a diameter which is smaller than the diameter of said cylindrical opening enabling said outer surface to engage said mandrel concentrically outwardly of said smaller diameter support shaft while allowing said compression spring to remain in its extended condition.

5. A tool as set forth in claim 1 and further comprising at least another cot cutting blade fastened to said housing and also having cutting edge means disposed within said enlargement.

6. A tool as set forth in claim 5 and further comprising means detachably fastening each of said cutting blades to said housing.

7. A tool as set forth in claim 6 in which said housing has a pair of diametrically opposed axial and radial slots disposed therein along said enlargement and communicating with said enlargement, each of said slots receiving an associated cutting blade therein.

8. A tool as set forth in claim 7 in which said means detachably fastening comprises a plurality of threaded screws for each cutting blade, each of said screws extending through an associated threaded opening in said housing and having an outer end which engages and clamps its associated blade against a surface of said housing defining an associated slot.

9. A tool as set forth in claim 5 in which said means for attaching said housing comprises thread means comprising a part of said housing.

10. A tool as set forth in claim 5 in which said stop means comprises a second enlargement defining an opposite end portion of said axial passage and defining an annular stop ledge, a male threaded portion at the rear portion of said assembly, a threaded nut-like member threadedly engaging said male threaded portion and disposed within said second enlargement, said nut-like member having a peripheral shoulder which is particularly adapted to engage said annular stop ledge upon urging of said assembly by said urging means.

11. A tool as set forth in claim 9 in which said thread means comprises a female threaded opening defined substantially centrally at one end of said housing and said one component is defined by a movable member of a press which has a threaded projection particularly adapted to be threadedly received within said threaded opening and said other component is defined by a stationary platen of said press.

* * * * *